March 21, 1933. A. W. SHAW 1,902,730
SIDE ARM CUSHION
Filed March 8, 1930 2 Sheets-Sheet 1
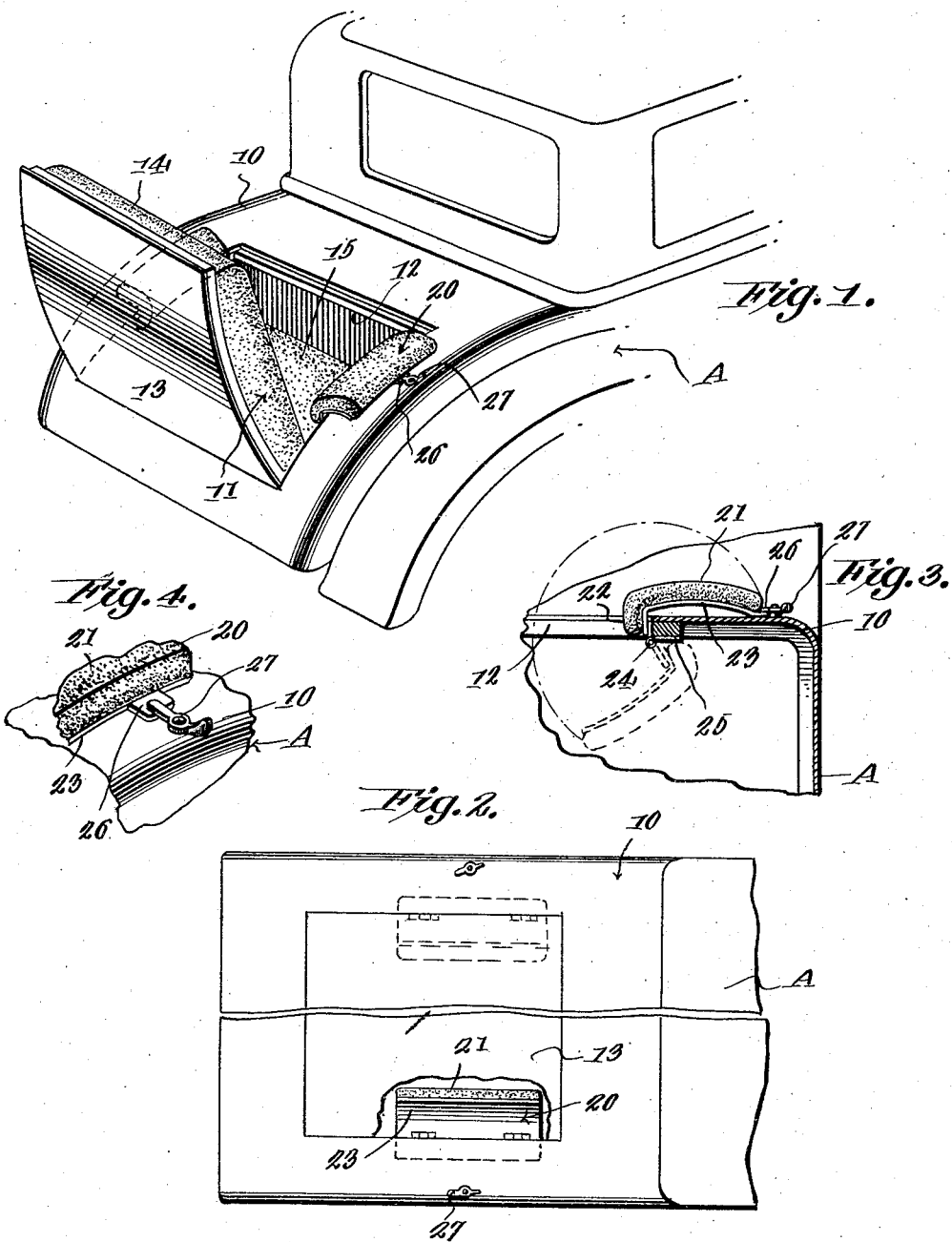
Inventor
ARTHUR W. SHAW

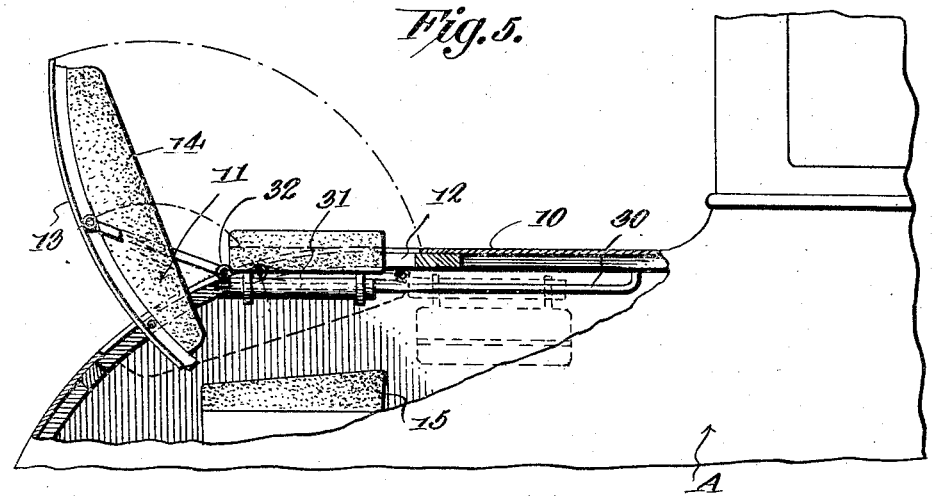
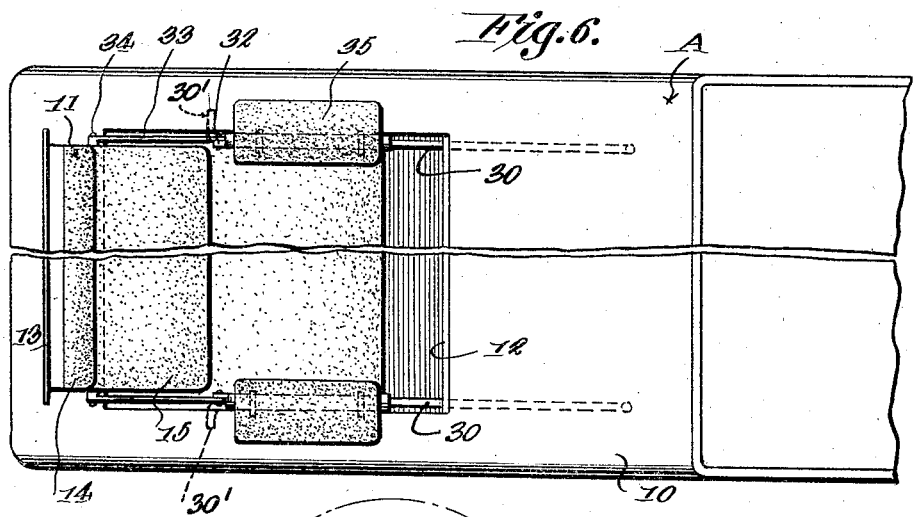
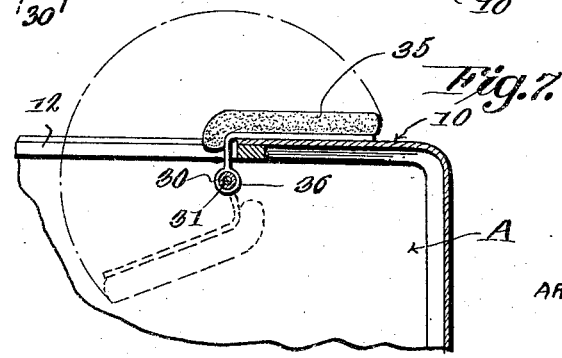

Patented Mar. 21, 1933

1,902,730

UNITED STATES PATENT OFFICE

ARTHUR W. SHAW, OF CAMBRIDGE, MASSACHUSETTS

SIDE ARM CUSHION

Application filed March 8, 1930. Serial No. 434,350.

This invention appertains to motor vehicles and more particularly to an attachment for rumble seats.

One of the primary objects of my invention is the provision of novel arm rests for rumble seats, so as to effectively aid in the comfortableness of such seats, the arm rests being so constructed as to form a guard and padding for the side edges of the deck opening, thereby preventing persons from coming into direct contact with said edges.

Another salient object of my invention is the provision of novel arm rests of substantially arcuate shape in cross section having their inner edges hingedly connected interiorly within the deck, the arm rests being adapted to swing over the sides of the deck opening when the back of the rumble seat is raised, the arm rests forming the dual function of rests for the arms and guards for the sides of the deck opening, the rests being normally disposed within the deck opening when the back of the rumble seat is in its lowered position.

A further object of my invention is the provision of means whereby the arm rests can be both slidably and hingedly mounted within the deck, with means connecting the back of the rumble seat to the slides of the arm rests whereby the arm rests will be brought into proper position to be swung over the sides of the opening in the deck when the back is moved to its raised position.

A still further object of my invention is to provide a novel arm rest and guard for rumble seats of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a fragmentary perspective view of an automobile of the type embodying a rumble seat looking from the rear thereof, showing the back of the rumble seat in its raised position and my improved arm rests in their operative position.

Figure 2 is a fragmentary top plan view of an automobile of the type embodying a rumble seat showing the same equipped with my improved arm rests, parts of the seat back being shown broken away the said back and arm rests being shown in their inoperative position.

Figure 3 is an enlarged detail fragmentary transverse section through the rear deck of an automobile equipped with a rumble seat illustrating the means of connecting one of my arm rests thereto and showing the arm rest in full line in its operative position and in dotted lines in its inoperative position.

Figure 4 is a fragmentary perspective view illustrating the means for latching the arm rests in place.

Figure 5 is a fragmentary side elevation of an automobile equipped with a rumble seat showing parts thereof broken away and in section and illustrating a modified form of my improved arm rest incorporated therewith.

Figure 6 is a fragmentary top plan view of an automobile equipped with a rumble seat showing my improved arm rest of the type shown in Figure 5 incorporated therewith, the rumble seat back and the arm rests being shown in their operative positions, and Figure 7 is an enlarged detail fragmentary transverse section through the rear deck of the automobile showing the same equipped with the type of arm rest shown in Figures 5 and 6, the arm rest being shown in full lines in its operative position and in dotted lines in its inoperative position.

Referring to the drawings in detail, and more particularly to Figures 1 to 4 inclusive, wherein similar reference characters designate corresponding parts throughout the several views, the letter A generally indicates an automobile of the coupe or roadster type embodying a rear deck 10 equipped with a rumble seat 11. As in the ordinary construction, the rear deck 10 is provided with the rear opening 12 normally closed by the swinging cover 13 which carries the back rest 14 for the rumble seat 11, the seat cushions 16 being arranged within the deck below the opening 12.

In accordance with my invention I have provided novel arm rests 20, for the rumble seat and these arm rests are of a particular shape and are associated with the deck in a particular way, for a purpose which will be specifically set forth.

It has heretobefore been proposed of providing arm rests for rumble seats and to have these arm rests carried by or connected with the swinging back of the rumble seat. Arm rests of this type do not give an adequate support for the arms and tend to occupy valuable space, that is the arm rests tend to lessen the active length of the seat and further these arm rests do not provide guards for the side sharp edges of the opening 12 in the deck. These side edges of the deck opening 12 give considerable inconvenience to persons riding in the rumble seat and the sides of the persons coming in contact with the edges of the seat opening 12 are often injured or bruised thereby.

It is therefore one of the salient features of my invention to provide the arm rests 20 of such a character that the same will not lessen the active length of the rumble seat and will act as guards for the side edges of the seat opening 12 as well as form adequate support for the arms of persons riding therein.

As shown in Figures 1 and 2, the arm rests 20 are arranged on opposite sides of the deck opening 12 and these arm rests are each of a substantially arcuate shape in cross section embodying a curved main arm rest portion 21 and a down-turned lateral inner edge portion 22. The arm rests 20 may be made in any desired way and of any preferred material and may include a frame or supporting plate portion 23 to which the cushion of the arm rest is secured. The inner lateral portion 22 of each arm rest is connected by means of hinges 24 with the adjacent frame bar 25 of the deck below the seat opening 12. By this arrangement, it can be seen that the arm rests 20 can be swung into the deck as shown in dotted lines in Figure 3 which is the normal inoperative position of the arm rests and when the arm rests are in this position the seat back and cover for the opening can be swung to its lowered position and the arm rests will be hid from view.

When the seat back and cover 13 are moved to a raised operative position the arm rests can be swung over the sides of the deck as shown in Figures 1, 3 and 4 and it is to be noted that the lateral portions 22 of the arm rests 20 completely cover and act as a guard for the side edges or walls of the deck opening 12 and that the main body portion 21 of the arm rests overlie the top of the deck. Thus the arm rests are disposed laterally beyond the ends of the seat cushion 15 and the seat back 14. This forms an adequate support for the arm and an efficient guard for the sharp side edges of the opening 12.

If preferred, the arm rests 20 can be held in their operative position by means of pivoted latches 27 carried by the deck movable over lips 26 of the arm rests.

In some types of cars and rumble seats wherein the arm rests 20 will be in the way of the seat cushions 15 and the seat back 11 when the seat back is swung to its lower position, I can provide means for moving the arm rests forwardly of the seat cushions. In Figures 5 to 7 inclusive I have illustrated such a construction. In this form I have provided longitudinally extending guide and supporting rods 30 which are suitably secured within the deck 10 below the opening 12, the rear ends being embedded in the side walls of the opening 12 as illustrated at 30' in Figure 6. As shown, these guide rods 30 extend an appreciable distance forwardly of the openings and in said deck. Slidably mounted on the guide rods 30 are tubular slide sleeves 31, the rear ends of which can be provided with upwardly extending pivot ears 32 to which can be hingedly connected operating links 33, the rear ends of which are in turn pivotally connected as at 34 to the sides of the seat back or cover 13 for the deck.

Hingedly mounted upon the slide sleeves 31 are the arm rests 35 which can be of the same form as the rests 20 illustrated in Figures 1 to 4 inclusive. In the present instance I have shown the frame for the arm rests 35 provided with collars or cuffs 36 which are rotatably or rockably mounted upon the guide sleeves 31.

By this construction, it can be seen that when the seat back is moved to its raised operative position, that the slide sleeves 31 will be slid rearwardly on the guide rods 31, after which the arm rests can be swung on the slide sleeves and moved over the top surface of the deck 10 as shown in Figures 6 and 7 of the drawings. When the cover 13 is to be moved to its closed position, the arm rests 35 are again swung inward of the deck in the dotted line position as shown in Figure 7 and the cover is then moved downwardly. The links 32 will slide the sleeves 31 forwardly and carry the arm rests under the deck 10 forwardly of the seat cushion 15 and out of the way of the seat cushion and the back rest 14.

From the foregoing description, it can be seen that I have provided novel arm rests for a rumble seat which will effectively act as a guard for the side edges of the seat opening.

Changes in details may be made without departing from the spirit or the scope of this invention, but:—

What I claim as new is:

The combination with a vehicle provided with a rumble seat opening having a hinged back secured thereto, a guiding rod extending longitudinally of the side of the rumble seat opening and hung under the side edge thereof, an arm rest slidably mounted upon said rod and capable of being swung thereon, whereby the arm rest may be moved over the edge of the rumble seat opening to protect the same, and means pivotally connecting the back to said arm rest for automatically moving said arm rest longitudinally upon said rod and away from the side edge of the rumble seat opening to permit the closing of said hinged back over said opening.

In testimony whereof I affix my signature.

ARTHUR W. SHAW.